United States Patent [19]

Swanson et al.

[11] 3,899,889
[45] Aug. 19, 1975

[54] PEDAL RATIO CONTROL FOR HYDRAULIC BOOSTER

[75] Inventors: Kenneth B. Swanson, Bannister; Herman M. Huffman, Owosso, both of Mich.

[73] Assignee: Midland-Ross Corporation, Cleveland, Ohio

[22] Filed: Apr. 15, 1974

[21] Appl. No.: 461,003

[52] U.S. Cl. .................. 60/547; 60/575; 60/550; 91/391
[51] Int. Cl. ............................................. F15b 7/00
[58] Field of Search ............ 60/533, 550, 553, 437, 60/547, 575; 91/170 R, 173, 422

[56] References Cited
UNITED STATES PATENTS

| | | | |
|---|---|---|---|
| 2,343,901 | 3/1944 | Groves | 60/575 |
| 2,886,950 | 5/1959 | Hause | 60/575 |
| 3,076,441 | 2/1963 | Ayer, Jr. | 60/550 X |
| 3,093,119 | 6/1963 | Stelzer | 91/391 |
| 3,148,592 | 9/1964 | Schultz et al. | 60/550 X |
| 3,306,043 | 2/1967 | Kellogg et al. | 60/550 X |
| 3,561,213 | 2/1971 | Shiber | 60/575 |
| 3,625,113 | 12/1971 | Euler | 91/437 X |
| 3,760,587 | 9/1973 | Ingram | 60/575 |
| 3,779,018 | 12/1973 | Baldwin | 60/575 |
| 3,793,829 | 2/1974 | Swanson | 60/547 |

*Primary Examiner*—Martin P. Schwadron
*Assistant Examiner*—H. Burks, Sr.
*Attorney, Agent, or Firm*—Frank J. Nawalanic

[57] ABSTRACT

A hydraulically operated booster brake mechanism which operates in response to movement of a brake pedal to move an output member to produce braking when a source of hydraulic pressure is available to assist such braking and also in the absence of such hydraulic pressure by employing a pair of differential pistons which, when the power brake is pressurized, separate to afford greater movement of the output member than of the pedal. The pistons move as a unit to afford equal output and input movement in the absence of any pressure and are so arranged that at runout when the maximum pressure from the source has been used, the pistons remain separated but move as a unit to afford equal output and input movement.

10 Claims, 2 Drawing Figures

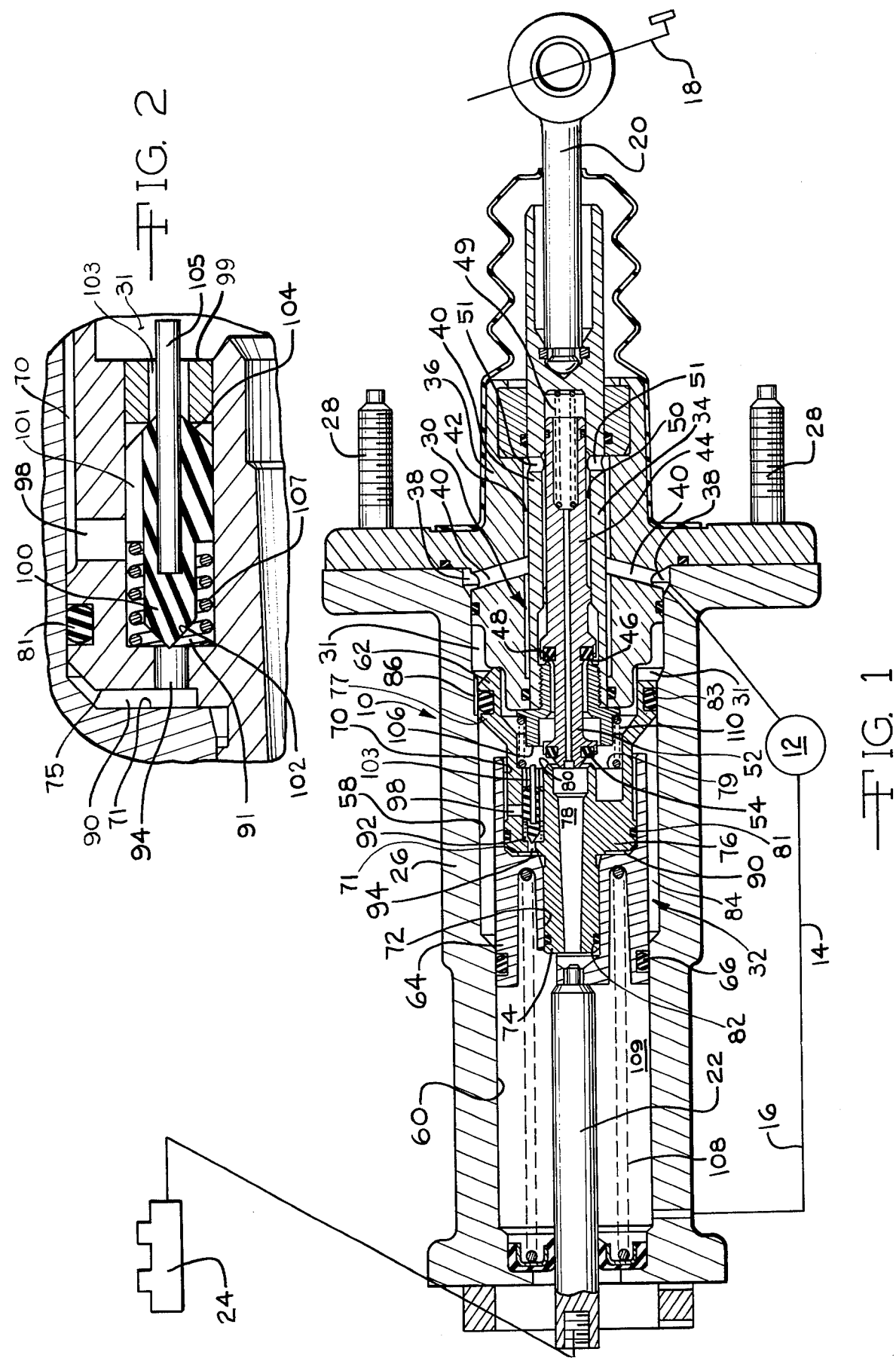

PEDAL RATIO CONTROL FOR HYDRAULIC BOOSTER

This invention relates to hydraulic booster mechanisms for use in automotive braking systems and more particularly to a booster mechanism requiring a relatively short input movement when hydraulic pressure is available to assist braking and a greater input movement is available in the absence of hydraulic pressure when braking must be produced by physical effort of the operator.

Safety requirements and regulations are such that for vehicles equipped with power or power assisted brakes certain specified stopping distances must be accomplished within a given time in the event that the power source for the power brake is lost or the power brake itself should malfunction. This requires the provision for a relatively large mechanical advantage so that the operator can manually apply the brakes. When sufficient mechanical advantage is provided by the brake pedal arrangement, an excessively large amount of travel of the pedal must also be employed to operate the power brake when it is in full working order and pressure is available. This is undesirable and contrary to what drivers of vehicles have come to expect in the operation of power brakes.

In an effort to provide a low ratio of pedal movement when power is available to assist braking and a greater ratio of pedal movement and, consequently, higher mechanical advantage when no power is available, various mechanisms have been proposed. One form of mechanism operates to change the position of the pedal from the normal power operated position to a different and higher position when power is unavailable. This results in two different starting positions of the brake pedal which is obviously undesirable since the operator must seek and find the pedal under the unusual conditions when the source of power has failed. Another form of brake utilizes mechanical levers to provide different ratios in the presence or absence of power. Such arrangements are subject to various problems of friction and wear which affects the proper response of the brake unit.

Still another form of solution to the problem is offered in U.S. Pat. No. 3,793,829 and this invention may be viewed as an improvement thereof. In that arrangement, differential pistons are employed so that movement of the power piston a given amount results in movement of the output piston a larger amount when pressure is available. In the absence of pressure, the two pistons move as a unit. However, when power fails during the time that a powered brake application is being made or when the braking application has been made to the runout point at which the maximum pressure has been utilized, the differential pistons must be returned to a position in which they are in contact with each other so that manual force may be transmitted from the power piston to the output piston and, consequently, to the brakes. This results in a sensation of the pedal falling away from the foot of the operator and, although it occurs only under the rare instances of power failure or maximum braking situations utilizing all of the available power, it may be found to be undesirable.

It is thus an object of the subject invention to provide in a hydraulic booster brake which is operative under one ratio of pedal movement when a source of power is available to provide braking and a greater ratio of pedal movement when the power is unavailable to complete desired braking, a piston arrangement which permits manual actuation of the booster at the greater travel ratio without any loss of pedal movement or pedal height.

This object along with other features of the subject invention is achieved in a hydraulic booster brake mechanism which is provided with a power piston and an output piston so arranged that the output piston moves a greater distance than the power piston during the brake application when power is available. In the event that fluid pressure becomes unavailable because it is lost or completely used, fluid is trapped in a piston chamber between the power piston and the output piston to maintain the pistons in the same spaced relation that they occupied at the time pressure became unavailable so that manual effort applied to move the power piston is transmitted to the output piston and the two pistons move together as a unit without any loss of pedal stroke to produce manual braking of the vehicle.

In accordance with another feature of the subject invention, the trapping of the fluid in the piston chamber is achieved by a unique pilot valve arrangement positioned within one of the pistons, which arrangement provides fluid communication between the piston chamber and a sealable ratio control cavity when hydraulic power is sufficient to actuate the brakes. When manual braking is required to achieve desired braking, either as an assist to the hydraulic power at runout of the booster or as the total braking source in the event of power failure, the pilot valve is automatically and positively positioned in a manner to bleed the ratio control cavity while trapping the fluid within the piston chamber.

It is thus another object of the subject invention to provide in a hydraulic booster brake a valving arrangement which is simple in design and easily incorporated into the booster construction and which positively acts to achieve two different travel ratios of the booster.

The invention may take physical form in certain parts and arrangement of parts, a preferred embodiment of which will be described in detail herein and illustrated in the accompanying drawing which forms a part hereof and wherein:

FIG. 1 is a longitudinal sectional view of a hydraulic booster brake mechanism embodying the invention with some of the associated components of the braking system shown schematically; and FIG. 2 is an enlarged sectional view of a portion of the hydraulic booster shown in FIG. 1.

Referring now to the drawing wherein the showings are for the purpose of illustrating the preferred embodiment of the invention only and not for the purpose of limiting same, there is shown a hydraulically operated booster brake mechanism 10 adapted to receive hydraulic pressure from a source 12 through a line 14 and to return that portion of the hydraulic fluid used in actuating the booster by way of a return line 16. For an understanding of the present invention, it is necessary only to consider that hydraulic pressure can be supplied to said booster brake mechanism 10 by any of a number of conventional hydraulic circuits such as a power steering system or a separate hydraulic circuit employing its own pump or in some instances an accumulator.

Booster brake mechanism 10 is operated by way of a foot pedal 18 which moves an input member 20 to control operation of power brake unit 10. Such operation results in movement of an output member 22 which actuates a conventional hydraulic master cylinder 24 forming a part of a conventional vehicle hydraulic brake system which is not shown.

Booster brake mechanism 10 includes a housing 26 which may be fastened by studs 28 in a conventional manner within the engine compartment of the vehicle with input member 20 connected to pedal 18.

Booster brake mechanism 10 incorporates a follow-up valve or an inlet-outlet valve assembly generally designated at 30 which is actuated in response to movement of input member 20 and brake pedal 18 to control the admission of hydraulic fluid from source 12 to a power chamber 31 within housing 26 to cause movement of a differential power piston assembly generally designated at 32. Movement of piston assembly 32 causes movement of output member 22 and actuation of master cylinder 24 to produce braking.

Valve assembly 30 includes a generally tubular control member 34 which is slidably sealed in an end cap member 36. End cap member 36 is sealed and fastened relative to housing 26 and forms a fluid supply chamber 38 therebetween which is in constant communication with fluid pressure source 12 by way of line 14. Fluid pressure from supply chamber 38 is supplied by way of radial passages 40 to an elongated annular chamber 42 formed between end cap 36 and control member 34.

Disposed within hollow control member 34 is a valve rod member 44 which is sealingly supported for relative sliding movement to control member 34. An intermediate portion of valve rod 44 is provided with an annular valve closure portion 46 which is adapted to engage and close an opening through an annular lip or seat 48.

Closure member 46 and annular valve seat 48 form the inlet valve of follow-up valve assembly 30. Inlet valve 46, 48 is normally maintained in its closed position by a spring 49 which acts between valve rod 44 and control member 34 to urge rod 44 to the left as viewed in the drawing to maintain closure element 46 in engagement with annular valve seat 48. An annular elongated chamber 50 is formed between valve rod 44 and the interior of control member 34 which communicates with annular chamber 42 through radial passages 51.

The left end of valve rod 44 is provided with a stem portion 52 which protrudes from the left end of control member 34 and has an end portion provided with an exhaust valve closure element 54.

Piston assembly 32 is slidably mounted in a stepped bore in housing 26 which has a large bore portion 58 and a smaller diameter bore portion 60 contiguous and in axial alignment therewith. Piston assembly 32 is made up of a power piston 62 and an output piston 64 which are mounted for sliding movement in bores 58 and 60, respectively, and for independent movement relative to one another.

Output piston 64 has a generally smooth external configuration and is sealed within small bore portion 60 by an output piston seal 66. The interior of output piston 64 is defined as being of a hollowed, cylindrically-stepped configuration. More particularly, the interior configuration is further defined by a first cylindrical portion 70 at one end of the output piston and a second smaller cylindrical portion 72 at the opposite end of the output piston with the juncture between cylindrical portions 70, 72 defined as an annular step 71.

Power piston 62 has a cylindrically-stepped exterior configuration defined by a first cylindrical portion 77 at one end approximately equal in diameter to large bore portion 58, a second smaller intermediate cylindrical portion 76 and a third stem cylindrical portion 74 at the opposite piston end smaller in diameter than second power piston portion 76. The juncture of third and second cylindrical portions 74, 76 is similar to output piston juncture 71 and is likewise defined as an annular step 75 (FIG. 2). The interior of power piston 62 is hollowed to define an axial passage 78 extending through third stem portion 74 and out intermediate second portion 76 to form an opening 80 which is engageable by closure member 54. Closure member 54 and opening 80 define the exhaust valve or outlet valve of follow-up valve assembly 30. The interior configuration of power piston 62 within second intermediate portion 76 is further defined as being cylindrically-stepped as at 79 to define a cup-shaped opening in fluid communication with power chamber 31; opening 80 extending through the center thereof.

As thus defined, a portion of power piston 62 is slidingly disposed within output piston 64. More particularly, second intermediate portion 76 of power piston 62 is received within first cylindrical portion 70 of output piston 64 in a sealing relationship by means of a first seal 81 and third cylindrical stem portion 74 of the power piston is received within second cylindrical portion 72 of the output piston in a sealing manner therewith by a second seal 82; seals 81, 82 being effective to define a sealable piston chamber 90 between annular step surfaces 71, 75. Power piston 62 and output piston 64 also cooperate with one another to define a ratio control cavity 84 within a portion of large bore portion 58. Ratio control cavity 84 is defined to exist in the space between large bore portion 58 bounded by output piston seal 66, first piston chamber seal 81 and a power piston seal 83 circumscribing first cylindrical portion 77 of the power piston. In the power piston position shown in the drawing, which represents the normal unactuated position of booster 10, ratio control cavity 84 is in fluid communication with power chamber 31 through an axially extending recess in housing 26 opening to large bore portion 58 or flute 86 which is so sized to permit free fluid communication between power chamber 31 and ratio control cavity 84. Power piston seal 83 is axially aligned with the lefthand edge of flute 86 as viewed in the drawing in such a manner to be effective to seal ratio control cavity 84 from power chamber 31 upon slight movement of the power piston when the booster is actuated from the position illustrated.

Disposed within second cylindrical portion 76 of power piston 62 and axially offset from the center thereof is a longitudinally-extending cylindrical passage 91 as best shown in FIG. 2. Cylindrical passage 91 is in fluid communication at one axial end with power chamber 31 and at its opposite axial end is in fluid communication with a smaller cylindrical opening 94 which, in turn, is in fluid communication with piston chamber 90. A second opening 98 shown as being radial in orientation is also in fluid communication with cylindrical passage 91 in between the ends thereof; opening 98 at its opposite end being in fluid communication with ratio control cavity 84.

Disposed within cylindrical passage 91 is a resilient pilot valve element 100 made of a suitable resilient, synthetic elastomer. Pilot valve 100 has a first conical end 102 adapted to seat within the seal opening 94 and a second cone-shaped end 104 adapted to seat within a central opening 103 provided in a circular retainer insert 99 inserted into cylindrical passage end adjacent chamber 31. Pilot valve 100 is also provided with a plurality of circumferentially spaced flutes 101 which extend along a portion of the axial length of the pilot valve to support pilot valve element 100 within cylindrical passage 91. A spring 107 seated at one end of cylindrical passage 91 adjacent opening 94 and bearing at its opposite end against the axial ends of flutes 101 normally biases pilot valve conical end 104 into sealing engagement with opening 103 thereby providing fluid communication between openings 94, 98. Pilot valve 100 is also provided with an actuating stem 105 imbedded therein which extends through central opening 103 of the retainer insert into power chamber 31. In the normal unactuated position of the booster as shown in FIG. 1, the end of stem 105 is spaced from an end portion or cup-shaped abutment mechanism 106 extending from control member 34 (FIG. 1). When end portion 106 contacts the end of actuating stem 105, pilot valve 100 is shifted towards the left as viewed in the drawing to close opening 94 and provide fluid communication from opening 98 to power chamber 31 through the spacing between flutes 101 and insert retainer opening 103. Importantly, the thickness of the flutes is not sufficient to impede fluid flow from opening 98 irrespective of the angular position pilot valve 100 may assume within cylindrical passage 91.

A return spring 108 is disposed in a return chamber 109 formed in bore 60 and acts between the left end of the chamber wall and output piston 64 to urge the latter to the right. Output piston 64 engages power piston 62 and also urges it to the right so that the right end engages the end cap member 36 as shown in the drawing. A valve return spring 110 acts between power piston 62 and control member 34 to urge the latter to the right into engagement with housing end cap member 36 which acts as a stop.

When booster brake 10 is in its normal position with hydraulic pressure being supplied from source 12 and with the brakes in an unapplied or brake-release condition, the various components occupy the position shown in the drawing and the entire booster mechanism 10 is filled with hydraulic fluid by means of an integrating valve not shown nor described herein as same does not form a part of the invention. Reference to U.S. Pat. No. 3,796,134 may be had for a description of such valve. For an understanding of the subject invention, it is sufficient to note that the integrating valve fills booster 10 with hydraulic fluid which fluid is pressurized from source 12 which, in turn, pressurizes fluid in the annular chamber 42, through radial passages 51 to annular chamber 50 within control member 34 wherein source pressure is "deadended" at the inlet valve 46, 48 when the booster is in the position shown with the remainder of the power brake mechanism and its various passages and cavities at return pressure, i.e., atmospheric pressure normally in the order of 5 psi or less, in return line 16. In this connection, it should be noted that the pressure of the hydraulic fluid in ratio control cavity 84 is at a minimum return pressure because ratio control cavity 84 communicates through flute 86 with power chamber 31 which, in turn, communicates through open exhaust opening 80 in passage 78 to return line 16. In like manner, piston chamber 90 is at minimum return hydraulic pressure because of its communication via passage 91 and openings 94, 98 with ratio control cavity 84.

When a brake application is to be made, a force is applied to the brake pedal 18 and is transmitted through input rod 20 to control member 34 to which it is connected. Such movement causes control member 34 and valve rod 44 to move as a unit compressing spring 110 until exhaust valve element 54 engages opening 80 to close passage 78. Subsequent movement of control member 34 to the left is made relative to valve rod 44 which remains stationary due to its engagement with power piston 62 causing spring 49 to be compressed during which time annular valve seat 48 moves with control member 34 away from stationary valve rod 44 and valve element 46. Opening of inlet valve 46, 48 admits pressure from annular chamber 42 in control member 34 to power chamber 31 formed at the right of power piston 62. An increase in hydraulic pressure in power chamber 31 causes power piston assembly 32 to move to the left because of the lesser pressure in return chamber 109 formed in bore 60.

Movement of power piston assembly 32 also requires continued movement of control member 34 to maintain exhaust valve 54, 80 closed and inlet valve 46, 48 open. For this reason, the valve arrangement is referred to as a follow-up valve, that is, the movement of the valve mechanism must follow the movement of power piston assembly 32 in order to maintain the exhaust valve closed and the inlet valve opened to continue increasing the pressure in the power chamber.

As piston assembly 32 begins its movement towards the left, power piston seal 83 immediately moves beyond flute 86 to isolate ratio control cavity 84 and piston chamber 90 from power chamber 31 and the remainder of booster 10. Pilot valve element 100 because of spring 107 and the pressure in piston chamber 90 remains in engagement with insert retainer opening 103 thus permitting fluid communication between piston chamber 90 and ratio control cavity 84 via openings 94, 98. Because fluid is thus trapped in piston chamber 90 and ratio control cavity 84 remains at a fixed volume, movement of power piston 62 towards the left as viewed in the drawing will result in leftward movement of output piston 64 relative to power piston 62 as piston chamber 90 expands to maintain the trapped volume of fluid constant. More particularly, since the effective diameter of power piston 62 is greater than the effective diameter of output piston 64, every increment of movement of power piston 62 towards the left will result in a larger incremental movement of output piston 64. Specifically, the effective diameter of power piston 62 defined as the diameter of first cylindrical section 77 minus the area of opening 80 divided by the effective diameter of output piston 64 defined as the difference in diameters between the outside diameter of output piston 64 and the inside diameter of second cylindrical section 74 will result in the exact travel ratio increase of booster 10. Because the pressure of the trapped fluid in ratio control cavity 84 and piston chamber 90 is approximately equal to or slightly less than the pressure in power chamber 31, a force magnification of output member 22 will not occur. Thus, normal operation of booster 10 requires only a small amount of movement of brake pedal 18 necessary to achieve power braking of the vehicle, an operating characteristic desirable in all power brake units.

After power piston assembly 32 begins movement to the left in a brake applied direction and after the desired degree of braking has been achieved, the operator does not apply additional force to pedal 18 but maintains the same force level previously applied. As a result, power piston 62 and valve rod 44 will instantaneously move to the left an additional increment relative to stationary control member 34 to permit closing of inlet valve 46, 48 while maintaining exhaust valve 54, 80 closed. This is the lap condition of valve assembly 30 in which the brakes will be held at a selected degree of actuation. Additional braking may be achieved by adding a greater force to the brake pedal 18 to move control member 34 to the left or the brake may be released by relieving manual effort from the brake pedal 18 to permit control member 34 to return to the right.

After the desired degree of braking is achieved, release of the brakes is accomplished by relieving the force on pedal 18 which allows control member 34 to move to the right relative to power piston 62 under the urging of valve return spring 110. Initially, inlet valve 46, 48 closes under the urging of spring 49 after which exhaust valve 54 separates from opening 80 to open passage 78 thereby permitting fluid under pressure in power chamber 31 to escape to return chamber 109 and through return line 16 back to pressure source 12. As the pressure in power chamber 31 decreases, the pressure in ratio control cavity 84 and piston chamber 90 between pistons 62 and 64 also decreases to the same level and as power piston assembly 30 moves to the right, output piston 64 is moved under the urging of return spring 108 in exhaust chamber 109. Such movement of pistons 62 and 64 occurs with the volume of fluid in ratio control cavity 84 and piston chamber 90 remaining constant and permits the pistons to move toward each other. Movement of power piston 62 to the right makes more of the larger bore 58 available for fluid and output piston 64 returns a greater distance than power piston 62 to maintain the fluid isolated in ratio control cavity 84 and piston chamber 90 at a constant volume. When power piston 62 reaches its original position, as shown in the drawing, output piston 64 will also be in the position shown, that is, in engagement with power piston 62.

If the maximum pressure available from source 12 is utilized during the time that the brakes are being applied, no further pressure is available to move power piston 62 and output piston 64 to the left to apply the brakes. This is known as the runout point and any additional braking which is to be achieved must be accomplished by the addition of physical force applied by the operator to the pedal 18 to input rod 20 and to control member 34 which moves into engagement with power piston 62. Such movement causes the end of the cup-shaped member 106 on control member 34 to abut against and engage stem 105 thereby moving pilot valve 100 from the position in which it is shown in the drawing to the left causing closing of opening 94 and opening of insert retainer opening 103. This traps any fluid contained in piston chamber 90 and prevents its escape and at the same time fluid in ratio control cavity 84 is free to escape through radial opening 98 and opening 103 to power chamber 31. The net result is that the fluid trapped in chamber 90 maintains pistons 62 and 64 spaced from each other so that any physical force causing movement of power piston 62 is transmitted through the fixed volume of fluid in chamber 90 and to output piston 64. In this connection, it should be clear that if the fluid previously trapped in ratio control cavity 84 were maintained trapped in that cavity, the travel ratio previously obtained in power braking would remain the same in the runout condition. Further, if the fluid previously trapped in ratio control cavity 84 were not bled into power chamber 31, the area of ratio control cavity 84 would be added to that of piston chamber 90 to provide a significant increase or resistance to the force applied by cup-shaped member 106 which would require more force at the brake pedal 18 to overcome than that of the subject invention. Importantly, because the bleeding of ratio control cavity 84 to power chamber 31 is positively insured by mechanical engagement of cup-shaped member 106 with actuating stem 105, the pressure within ratio control cavity 84 is instantaneously depleted via openings 98, 103 as such openings are not believed to act as orifices significantly affecting the pressure released from the ratio control cavity.

The operation of the booster brake mechanism when the source of pressure 12 fails during the time that a brake application is being made is substantially the same as the operation beyond the runout point described above.

When the brakes are released from a level beyond the runout point, control member 34 will first move to the right under the urging of spring 110 causing inlet valve 46, 48 to close and exhaust valve 54, 80 to open to exhaust pressure from power chamber 31. At the same time, cup-shaped member 106 moves out of engagement with stem 105 and valve 100 closes under the urging of spring 107 and the pressure in piston cavity 90. Piston assembly 32 will continue movement to the right under the urging of return spring 108 and also the return spring (not shown) in master cylinder 24 with output piston 64 moving a greater amount than power piston 62 until power piston 62 passes flute 86 thereby providing fluid communication between ratio control cavity 84 and power chamber 31.

If the brakes are to be applied from a fully released position and in the absence of any hydraulic fluid available at source 12, valve 100 is moved to the left by control member 34 but power piston 62 and output piston 64 will already have been in contact with each other and, consequently, power piston assembly 32 moves as a unit to the left and fluid from the ratio control cavity 84 is forced through openings 98 and 103 to power chamber 31 as piston assembly 32 moves to the left.

During usual application and release of the brakes, a ratio of movement is maintained between input member 20 and output member 22 so that output member 22 moves a greater distance than input member 20. This affords a small amount of pedal movement during power application of the brakes. However, when the runout point is attained or when the power source fails during application of the brakes, input member 20 and output member 22 move as a unit in a 1:1 ratio during the time that physical force applied to pedal 18 is being added to the braking effort. This gives the operator a greater movement of pedal 18 when power is unavailable than when the brakes are being operated by fluid pressure.

The invention has been described with reference to a preferred embodiment. Obviously, modifications and alterations will occur to others upon reading and understanding the specification. It is our intention to include all such modifications and alterations insofar as they come within the scope of the present invention.

It is thus the essence of the invention to provide a dual acting pilot valve arrangement in combination with a piston arrangement within a hydraulic booster brake mechanism effective to provide a first ratio of pedal input movement to output booster travel when the booster is operated by a source of hydraulic pressure and a second larger pedal ratio travel when the source of hydraulic pressure is insufficient to achieve desired braking and the booster must be manually operated.

Having thus disclosed the subject invention, we claim:

1. A booster brake mechanism operated by a source of hydraulic pressure and capable of being manually operated when said source of hydraulic pressure is insufficient to achieve desired braking, said booster comprising:

a housing having a large bore portion and a smaller bore portion contiguous therewith;

a power piston movable in said large bore portion and forming at one side thereof and within a portion of said large bore portion a power chamber;

an output piston movable in said smaller bore portion and extending into said large bore portion to form between the other side of said power piston, the remaining portion of said large bore portion and said output piston a fluid-containing, sealable ratio control cavity;

said output piston having a generally cylindrically-stepped hollow interior configuration, said power piston having a generally cylindrically-stepped exterior configuration received at least in part within said interior configuration of said output piston to define a fluid-containing, sealed piston chamber therebetween;

pilot valve means extending within said power piston providing fluid communication between said ratio cavity and said piston chamber in a normal unactuated position of said booster and movable to a second position to provide fluid communication between said ratio control cavity and said power chamber while trapping said fluid within said piston chamber;

inlet and outlet valve means between said source and said power chamber operative to pressurize said power chamber for moving said power piston thereby pressurizing at approximately equal pressure said ratio cavity and said piston chamber, such movement of said power piston simultaneously effecting a greater movement of said output piston; and manually actuable valve means associated with said inlet and outlet valve means operable to actuate said pilot valve means to said second position for effecting approximately equal movements of said power piston and said output piston.

2. The booster brake mechanism of claim 1 further including:

an axially extending recess in said housing opening to said large bore portion;

said power piston aligned in predetermined relationship with said recess when said booster is unactuated;

a seal circumscribing said power piston ineffective to prevent fluid communication between said ratio control cavity and said power chamber through said recess when said booster is unactuated and effective upon movement of said power piston to seal said ratio control cavity thereby trapping said fluid therein.

3. The booster brake mechanism of claim 2 wherein:

said output piston has a cylindrical external configuration and said cylindrically-stepped interior configuration further defined by a first cylindrical portion at one end of said output piston, a second, smaller cylindrical portion at the opposite end of said output piston and an annular step at the juncture therebetween;

said cylindrically-stepped exterior configuration of said power piston further defined by a first cylindrical portion approximately equal in diameter to said large bore portion, a second, smaller intermediate cylindrical portion and a third cylindrical portion smaller in diameter than said second portion at the opposite power piston end, the juncture of said second and third cylindrical portions defined as an annular step;

said second intermediate portion of said power piston sealingly received within said first cylindrical portion of said output piston and said third cylindrical portion of said power piston sealingly received within said second cylindrical portion of said output piston to further define said piston chamber between said annular surfaces of said power and output pistons.

4. The booster brake mechanism of claim 3 wherein:

said second intermediate cylindrical portion of said power piston has a cylindrically-stepped, cup-shaped interior configuration defining a portion of said piston chamber;

said second intermediate portion of said power piston further having a cylindrical passage extending therein in fluid communication at a first end with said power chamber, a smaller opening at the opposite second end of said cylindrical passage in fluid communication with said piston chamber and a second opening communicating said ratio cavity and said cylindrical passage in between the ends thereof;

said pilot valve means including a cylindrical elastomer valve element disposed within said cylindrical passage and axially retained therein by a circular retainer insert in said first end of said cylindrical passage having a central opening extending therethrough, said valve element having a first cone-shaped end adapted to seat within said smaller opening adjacent said first end of said cylindrical passage, and a second cone-shaped end for seating within said central opening of said retainer insert;

said pilot valve element further defined by a plurality of circumferentially disposed flutes maintaining said pilot valve element aligned within said cylindrical passage and biasing means normally maintaining said second end of said valve element seated in said central opening of said retainer insert.

5. The booster brake mechanism of claim 4 wherein:

an actuating rod extends from said pilot valve element through said opening in said retainer insert into said power chamber;

said inlet and outlet valve means including an input member extending within said first bore portion of said housing and adapted to be axially moved within said housing by the operator to effect actuation of said booster; and said manually actuable valve means including abutment means extending from said input member operable to engage said actuating rod to seal said smaller opening by said first end of said valve element and contact said cup-shaped portion of said power piston to effect movement of said output piston when said source of hydraulic pressure is insufficient to achieve desired braking.

6. In a hydraulic booster brake normally operable by a source of pressurized fluid and capable of being manually operated when said source of pressure is insufficient to achieve desired braking, said booster brake including a housing having a small bore portion contiguous with a large bore portion therein, an input member extending within said large bore portion and movable further therein by the operator of said booster, an output member extending from said small bore portion and movable further therefrom in response to inward movement of said input member, power piston means movable within said large bore portion and defining a power chamber within said first bore portion, inlet and outlet valve means associated with said input member operable in response to movement of said input member to pressurize said power chamber and move said piston means; output piston means sealed within said small bore and defining with said power piston means a fluid-containing ratio control cavity in a portion of said large bore portion, said ratio control cavity being isolated upon movement of said power piston means; said power piston means and said output piston means further effective to define a fluid-containing piston chamber therebetween effective with said ratio control cavity to cause said output piston to travel a greater distance than said power piston upon said power chamber being pressurized by said inlet and outlet valves, the improvement comprising:

passage means within at least one of said piston means providing fluid communication between said ratio control cavity, piston chamber and power chamber;

pilot valve means associated with said passage means having a normal first position providing fluid communication between said ratio control cavity and said piston chamber and a second position providing fluid communication between said ratio control cavity and said power chamber while isolating the fluid within said piston chamber, said pilot valve means being in said first position when said input member moves to actuate said inlet and outlet valve means; and abutment means associated with said input member and operable during said manual operation of said booster to shift said pilot valve means to its second position for pressurizing said piston chamber only to effect a rate of travel of said output piston means different from that when said output piston means is actuated at said first position of said pilot valve means.

7. The booster brake mechanism of claim 6 wherein: said output piston means includes an output piston having a generally cylindrically-stepped hollow interior configuration, said power piston means includes a power piston having a generally cylindrically-stepped exterior configuration received at least in part within said interior configuration of said output piston to further define said fluid-containing piston chamber;

said power chamber formed in said large bore portion at one side of said power piston and said ratio control cavity formed between the other side of said power piston and said output piston in said large bore portion.

8. The booster brake mechanism of claim 6 wherein: said output piston has a cylindrical external configuration and said cylindrically-stepped interior configuration further defined by a first cylindrical portion at one end of said output piston, a second, smaller cylindrical portion at the opposite end of said output piston and an annular step at the juncture therebetween;

said cylindrically-stepped exterior configuration of said power piston further defined by a first cylindrical portion approximately equal in diameter to said large bore portion, a second, smaller intermediate cylindrical portion and a third cylindrical portion smaller in diameter than said second portion at the opposite power piston end, the juncture of said second and third cylindrical portions defined as an annular step;

said second intermediate portion of said power piston sealingly received within said first cylindrical portion of said output piston and said third cylindrical portion of said power piston sealingly received within said second cylindrical portion of said output piston to further define said piston chamber between said annular surfaces of said power and output pistons.

9. The booster brake mechanism of claim 8 wherein: said second intermediate cylindrical portion of said power piston has a cylindrically-stepped, cup-shaped interior configuration defining a portion of said piston chamber;

said second intermediate portion of said power piston further having a cylindrical passage extending therein in fluid communication at a first end with said power chamber, a smaller opening at the opposite second end of said cylindrical passage in fluid communication with said piston chamber and a second opening communicating said ratio cavity and said cylindrical passage in between the ends thereof;

said pilot valve means including a cylindrical elastomer valve element disposed within said cylindrical passage and axially retained therein by a circular retainer insert in said first end of said cylindrical passage having a central opening extending therethrough, said valve element having a first cone-shaped end adapted to seat within said smaller opening adjacent said first end of said cylindrical passage, and a second cone-shaped end for seating within said central opening of said retainer insert;

said pilot valve element further defined by a plurality of circumferentially disposed flutes maintaining said pilot valve element aligned within said cylindrical passage and biasing means normally maintaining said second end of said valve element seated in said central opening of said retainer insert.

10. The booster brake mechanism of claim 9 herein:

an actuating rod extends from said pilot valve element through said opening in said retainer insert into said power chamber;

said inlet and outlet valve means including an input member extending within said first bore portion of said housing and adapted to be axially moved within said housing by the operator to effect actuation of said booster; and said manually actuable valve means including abutment means extending from said input member operable to engage said actuating rod to seal said smaller opening by said first end of said valve element and contact said cup-shaped portion of said power piston to effect movement of said output piston when said source of hydraulic pressure is insufficient to achieve desired braking.

* * * * *